2,964,484

CROSS-LINKED REACTION PRODUCT OF AN EPOXIDIZED FATTY ACID ESTER AND POLYVINYL HALIDE OR CELLULOSE NITRATE

Thomas W. Findley, La Grange, Ill., and John L. Ohlson, South Braintree, Mass., assignors to Swift & Company, Chicago, Ill., a corporation of Illinois No Drawing. Filed Nov. 30, 1956, Ser. No. 625,250

7 Claims. (Cl. 260—23)

This invention relates generally to rigid polymeric materials and methods for their preparation and more particularly to the preparation of novel solvent and heat resistant rigid polymers of polyepoxides and resins compatible therewith.

Rigid resins because of their light weight, ease of fabrication and great strength are used industrially for many purposes. Currently, rigid resins are employed in the fabrication of pipes, as liners for reaction vessels, for wire coating and for floor coverings. Polymeric materials intended for such uses must be resistant to the effect of solvents and in addition should not melt at high temperatures.

Unplasticized polyvinyl chloride, which has been employed heretofore for the aforementioned purposes, has a number of disadvantages not present in the rigid resin products of the present invention. A special grade of polyvinyl chloride is required in the formulation of rigid unplasticized resin, and temperature control is rather critical in the fabrication operations.

It is therefore an object of the present invention to provide novel rigid polymeric compositions which are substantially insoluble and infusible and are well adapted to easy fabrication at comparatively low temperatures.

A further object of the present invention is to provide new resin compositions which may be easily fabricated by conventional formulation methods followed by treatment to stiffen the resin to a rigid form.

Additional objects if not specifically set forth herein will be readily apparent to one skilled in the art from the following detailed description of the invention.

In accordance with the practice of the present invention, rigid resin compositions having improved resistance to melting at high temperatures, and substantial insolubility in organic solvents, acids and alkalis are obtained by treating a mixture of a polyepoxy compound containing more than one

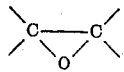

group and a resin compatible therewith in such a manner as to establish cross linking between polymer chains and convert the mixture into an insoluble infusible plastic.

The terms "cross linked" and "cross linking" as used in the specification and claims to follow refer to a product characterized by substantial insolubility and resistance to melting at high temperatures.

More specifically, the present invention comprises mixing an ester containing a plurality of epoxy groups such as an epoxidized animal or vegetable fatty material, with a polymeric material such as a polyvinyl halide which is compatible with the epoxidized fatty material; shaping the flexible mixture into the form desired, and subjecting the formed mixture to chemical or physicochemical action to produce a rigid product.

Mixing of the components can be achieved either by calendering, in which a paste mixture of epoxidized oil and resin is heated on milling rolls to produce a homogeneous mixture, or by solution casting which comprises depositing a film from a solution of the mixture in a volatile organic solvent. Milling on hot rolls can be carried out at a temperature of around 140–160° C. Solution casting requires heating only to the point necessary to evaporate the volatile solvent.

The epoxy containing materials which may be used in preparing the rigid resins of the present invention include epoxidized glycerides containing sufficient oxirane oxygen to be compatible with the thermoplastic resin. Epoxidized oleic-linoleic acid oils such as epoxidized safflower seed oil, epoxidized soybean oil, and epoxidized linolenic acid oils such as epoxidized linseed oil are typical desirable glycerides. The epoxidized compounds may also be characterized as long chain fatty esters having in excess of one epoxy group per molecule and derived from polyethenoid acids having a chain length of from 11 to 22 carbon atoms. In addition, compounds of the bisphenol-epihalohydrin condensation product type are useful as the oxirane containing component.

The polymeric materials which are applicable in the manufacture of the rigid plastic products of the present invention include generally those polymers which are compatible with the epoxidized compositions mentioned previously. The vinyl halides such as polyvinyl chloride and polyvinylidene chloride as well as cellulose nitrate and other thermoplastic materials from which the polyepoxide will not bleed may be employed as the polymeric component.

Although at ambient temperatures and in the absence of further treatment, the polyepoxy compositions act as a plasticizer for the thermoplastic component, the increased rigidity in the product after the cross-linking treatment is indicative of reaction between the resin and the polyepoxide.

The cross-linked materials of the present invention may be prepared by subjecting a flexible plasticized formulation to actinic radiations. The following examples illustrates the method of producing the rigid products of the present invention by use of ultraviolet rays:

EXAMPLE I

Plastisol (resin and non-volatile plasticizer) formulations containing 100 parts polyvinyl chloride and 60 parts plasticizer were mixed to the consistency of a heavy paste, spread on glass plates and oven-cured to form films. The films were irradiated for 10 days with a 15 watt mercury vapor lamp placed at a distance of about 6 inches from the film. Table I shows appearance and flexibility characteristics of the resultant films.

Table I

| Composition | Film Appearance |
|---|---|
| Polyvinyl Chloride—Dioctyl Phthalate | Brown, Little stiffening. |
| Polyvinyl Chloride—Epoxidized Soybean Oil | Yellow, very stiff. |
| Polyvinyl Chloride—Epoxidized Safflower | Do. |
| Polyvinyl Chloride—Epoxidized Linseed Oil | Do. |
| Polyvinyl Chloride—Epoxidized Lard Oil | Yellow, stiff. |
| Polyvinyl Chloride—Epoxidized Acetylated Soybean Oil. | Yellow, Bleeding badly. |
| Polyvinyl Chloride—Methyl Epoxystearate | Do. |

It is evident that the plasticizer compositions prepared from esters containing a minimum number of oxirane groups such as methyl epoxystearate and epoxidized acetylated soybean oil are incompatible with the thermoplastic resinous component of the mixture after irradiation. Although the process of preparing the rigid products by ultraviolet irradiation requires a substantial treatment time, the method has good applicability where very thin films are desired or where the degree of rigidity required is of a lesser magnitude.

The stiffening phenomenon of the present invention has also been achieved through thermochemical means. Epoxidized oils containing a small amount of acid catalysts such as phosphoric acid and Lewis acids ($BF_3$ and $ZnCl_2$) may be formulated with the resin and stiffened merely by heating. Epoxidized oils prepared in accordance with the acid catalyzed epoxidation reaction disclosed in our copending application Serial No. 437,876, filed June 18, 1954, when formulated with compatible thermoplastic resins, produce stiffened films merely upon heating. The degree of stiffening appears to be a function of both heating time and the quantity of catalyst employed in epoxidizing the oil. The acid catalyzed epoxidation process involves the treatment of unsaturated higher aliphatic materials with performic acid formed in situ from hydrogen peroxide and formic acid employing a strong acid as a catalyst for forming the performic acid. Catalytic amounts of phosphoric acid, sulfuric acid, nitric acid, perchloric acid, and acidic iron exchange resins such as the sulfonic acid-polystyrene resins are suitable strong acids which can be used as catalysts in the process.

The process involves the exothermic reaction of unsaturated higher aliphatic materials with aqueous hydrogen peroxide in the presence of small amounts of formic acid and a stong acid as the catalyst. The temperature of the reaction is controlled to keep it within the range of 20° C.–100° C., preferably from 35–45° C. The strong acid used to produce performic acid in situ increases the rate of reaction with the result that optimum yield is reached more rapidly.

EXAMPLE II 10 parts polyvinyl chloride and 4 parts plasticizer were dissolved in 200 parts methyl ethyl ketone. The solution was poured into metal receptacles and the solvent was allowed to evaporate. The film was heated in the oven at 150° C. for 0.5-, 2-, and 4-hour periods. Plasticizers were epoxidized soybean oil prepared in accordance with the process of the aforementioned patent application, using 0.5, 1, 2, and 4 percent sulfuric acid catalyst. Table II illustrates the effect of heating time and the amount of catalyst employed in preparing the epoxide plasticizer on the rigidity of the film formed.

*Table II*

| Time of Heating at 150° C. (hrs.) | Percent $H_2SO_4$ Used in Epoxidation | | | | |
|---|---|---|---|---|---|
| | 0 | 0.5 | 1 | 2 | 4 |
| 0 | − | − | − | − | + |
| 0.5 | − | − | − | ++ | ++ |
| 2 | − | − | + | +++ | +++ |
| 4 | − | − | + | +++ | ++++* |

(−) No stiffening; (+) slight stiffening; (++++) very rigid.
(*) Darkened—flexibility increased.

Although heating in the above examples is limited to 150° C., it should be understood that longer heating times or higher temperatures and shorter heating time may be employed. In some cases, as with the oil prepared using 0.5 percent sulfuric acid in the above example, temperatures as high as 250° C. may be required.

The effect of the polyepoxide in causing cross-linking and imparting solvent and melting resistance to the mixture is very substantial since only a very small portion of epoxide to thermoplastic is required to accomplish the change. Greater rigidity will be obtained, however, where larger amounts of the thermoplastic resin are employed in the mixture. Depending on the rigidity desired in the final product, as little as 1 percent epoxide and as much as 90 percent of this material may be employed in the mixture with the polymer. At the lower level of 1 percent added epoxide, substantial insolubility and resistance to melting is achieved with a thermoplastic which otherwise flows on moderate heating. For most purposes approximately 10–50 percent polyepoxide will be a preferred range. It is possible, therefore, to produce relatively flexible insoluble and infusible products by employing a maximum amount of epoxide in the mixture or a very rigid insoluble infusible product by adding a small amount of the epoxide composition to the resin.

In the formulation of the rigid heat and solvent resistant compositions described herein it is of course possible to incorporate fillers, pigments, and other relatively inert materials as desired.

While an attempt has been made to set forth above an explanation of the mechanism involved in the reaction, the invention should not be limited thereby, since such explanations are given only in an attempt to further facilitate an understanding of the invention.

Obviously, many modifications and variations of the invention hereinbefore set forth may be made without departing from the spirit and scope thereof, and therefore only such limitations should be imposed as are indicated in the appended claims.

We claim:
1. An insoluble infusible polymeric composition which comprises: the cross-linked reaction product of epoxidized linseed oil and a thermoplastic resin compatible therewith, said resin being selected from the group consisting of polyvinyl halides and cellulose nitrate.

2. An insoluble, infusible polymeric composition comprising: the cross-linked reaction product of epoxidized safflower seed oil and a resin compatible with said epoxidized safflower seed oil said resin being selected from the group consisting of polyvinyl chloride and cellulose nitrate.

3. An insoluble, infusible polymeric composition which comprises: the cross-linked reaction product of epoxidized rape seed oil and a thermoplastic resin compatible therewith said resin being selected from the group consisting of polyvinyl chloride and cellulose nitrate.

4. An insoluble, infusible polymeric composition comprising: the cross-linked reaction product of polyvinyl chloride and 1–90% based on the weight of the polyvinyl chloride of epoxidized linseed oil.

5. A method for decreasing the flexibility of a polyepoxide plasticized thermoplastic composition which comprises: admixing a thermoplastic resin selected from the group consisting of polyvinyl halides and cellulose nitrate, with a polyepoxide prepared by the acid catalyzed epoxidation of a long-chain fatty acid ester; spreading the plasticized mixture in a film on a surface; curing said film by heating; and further heating said dried film at a temperature of around 150° C. for a period of from 0.5 to 4 hours.

6. A method for increasing the rigidity and melting resistance of a polyvinyl halide resin comprising mixing with a polyvinyl chloride polymer about 10–50 parts for each 100 parts polyvinyl chloride polymer of a polyepoxide prepared by the sulfuric acid catalyzed epoxidation of a long-chain fatty acid ester to form a mixture, shaping said mixture to the desired form, and heating said formed mixture to a temperature of about 150° C. to about 250° C. to produce a substantially insoluble infusible product.

7. A method of cross-linking a polyvinyl halide resin comprising mixing a polyvinyl halide resin and an epoxidized fatty acid ester, said ester containing in excess of one epoxy group per molecule, and being prepared by the sulfuric acid catalyzed epoxidation of a fatty acid ester to form a mixture, and heating said mixture to a temperature of around 150° C. for about 0.5 to 4 hours.

References Cited in the file of this patent

UNITED STATES PATENTS

| | | |
|---|---|---|
| 2,556,145 | Niederhauser | June 5, 1951 |
| 2,559,177 | Terry et al. | July 3, 1951 |
| 2,604,457 | Segall et al. | July 22, 1952 |
| 2,669,549 | Darby | Feb. 16, 1954 |
| 2,795,565 | Newey | June 11, 1957 |

OTHER REFERENCES

Greenspan et al.: "Ind. and Eng. Chem.," vol. 45, No. 12, December 1953, pages 2722–2726.

Witnauer et al.: Ibid., vol. 47, No. 11, November 1955, pages 2304–2311.

Brewster: "Organic Chemistry," second edition (1953), Prentice-Hall, N.Y., page 234.